US005285019A

United States Patent [19]
Kempf et al.

[11] Patent Number: 5,285,019
[45] Date of Patent: Feb. 8, 1994

[54] MODULAR IDLER STATION BELT SCALE APPARATUS

[75] Inventors: David Kempf, Nineveh, Ind.; Juergen Lauber, Karlsdorf, Fed. Rep. of Germany

[73] Assignee: Endress + Hauser Inc., Greenwood, Ind.

[21] Appl. No.: 946,528

[22] Filed: Sep. 16, 1992

Related U.S. Application Data

[63] Continuation-in-part of Ser. No. 878,836, May 5, 1992.

[51] Int. Cl.$^5$ ............................................. G01G 11/14
[52] U.S. Cl. ........................................ 177/16; 177/52; 177/119
[58] Field of Search ................. 177/16, 52, 119, 145, 177/136, 211

[56] References Cited

U.S. PATENT DOCUMENTS

| | | | |
|---|---|---|---|
| 1,032,183 | 7/1912 | Buchan | 177/119 |
| 1,654,407 | 12/1927 | Boulogne | 177/119 |
| 1,744,232 | 1/1930 | Lenton | 177/119 |
| 1,808,930 | 6/1931 | Messiter | 177/119 |
| 2,228,068 | 1/1941 | White | 177/119 |
| 2,285,719 | 6/1942 | Jerome et al. | 177/119 |
| 2,311,614 | 2/1943 | Walter | 177/145 |
| 2,533,710 | 12/1950 | Biehler | 177/119 |
| 3,070,214 | 12/1962 | Del Rosso | 177/145 |
| 3,119,457 | 1/1964 | Thompson et al. | 177/16 |
| 3,133,605 | 5/1964 | Christmann | 177/145 |
| 3,180,475 | 4/1965 | Del Rosso | 177/52 |
| 3,299,975 | 1/1967 | Stambera et al. | 177/119 |
| 3,331,457 | 7/1967 | Blubaugh | 177/119 |
| 3,387,675 | 6/1968 | MacFarlane | 177/119 |
| 3,439,761 | 4/1969 | Laimins | 177/119 |
| 3,478,830 | 11/1969 | Levesque et al. | 177/210 |
| 3,513,921 | 5/1970 | Refer et al. | 177/119 |
| 3,559,451 | 2/1971 | Hyer et al. | 177/119 |
| 3,561,553 | 2/1971 | Blubaugh | 177/168 |
| 3,650,340 | 3/1972 | Bradley | 177/136 |
| 3,661,220 | 5/1972 | Harris | 177/136 |
| 3,785,447 | 1/1974 | Blackerby | 177/119 |
| 3,863,725 | 2/1975 | Raynes | 177/210 |
| 3,924,729 | 12/1975 | Flinth et al. | 177/16 |
| 4,020,911 | 5/1977 | English et al. | 177/136 |
| 4,095,659 | 6/1978 | Blench et al. | 177/136 |
| 4,114,708 | 9/1978 | Saner | 177/145 |
| 4,128,001 | 12/1978 | Marks | 73/1 B |
| 4,157,661 | 6/1979 | Schindel | 73/228 |
| 4,249,623 | 2/1981 | McCauley | 177/136 |
| 4,260,034 | 4/1981 | Randolph, Jr. | 177/211 |
| 4,380,175 | 4/1983 | Griffen | 73/862.67 |
| 4,463,816 | 8/1984 | MacFarlane | 177/119 |
| 4,541,496 | 9/1985 | Layer | 177/211 |
| 4,557,341 | 12/1985 | Soederholm | 177/119 |
| 4,682,664 | 7/1987 | Kemp | 177/16 |
| 4,788,930 | 12/1988 | Matteau et al. | 177/16 |

Primary Examiner—Benjamin R. Fuller
Assistant Examiner—Randy W. Gibson
Attorney, Agent, or Firm—Barnes & Thornburg

[57] ABSTRACT

A scale apparatus is provided for weighing material moving in a downstream direction on a conveyor belt supported by a conveyor frame. The apparatus includes an upstream idler station, a downstream idler station, and a measuring idler station situated between the upstream idler station and the downstream idler station. The apparatus also includes a mechanism for measuring the weight of material moving on the conveyor belt. The measuring mechanism is coupled to the measuring idler station. The upstream idler station, the measuring idler station, and the downstream idler station are coupled together to form a scale unit. The scale unit is coupled to the conveyor frame so that the conveyor belt passes over the upstream idler station, the measuring idler station, and the downstream idler station.

24 Claims, 8 Drawing Sheets

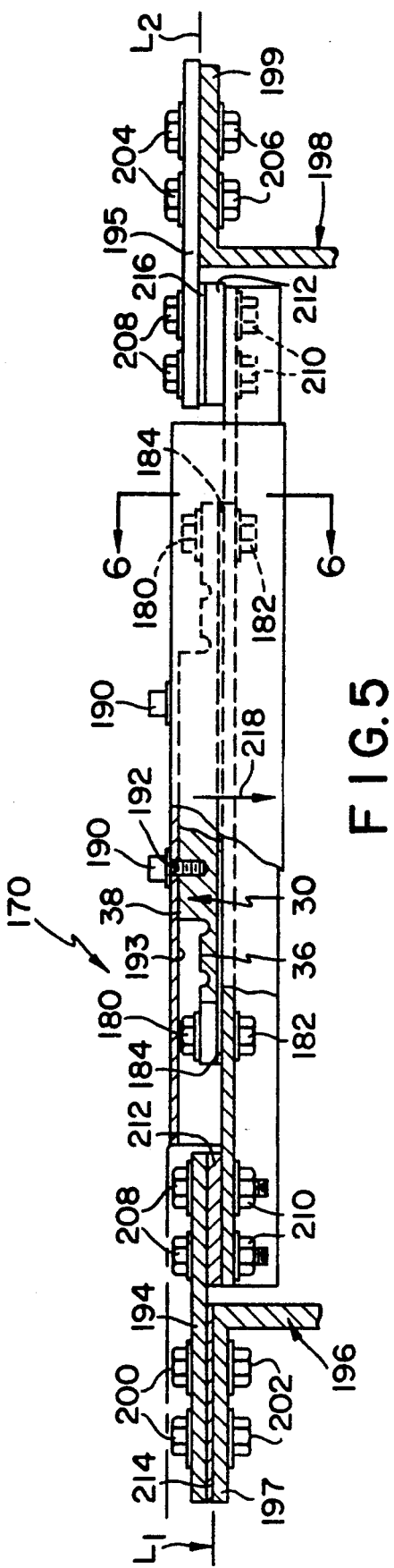
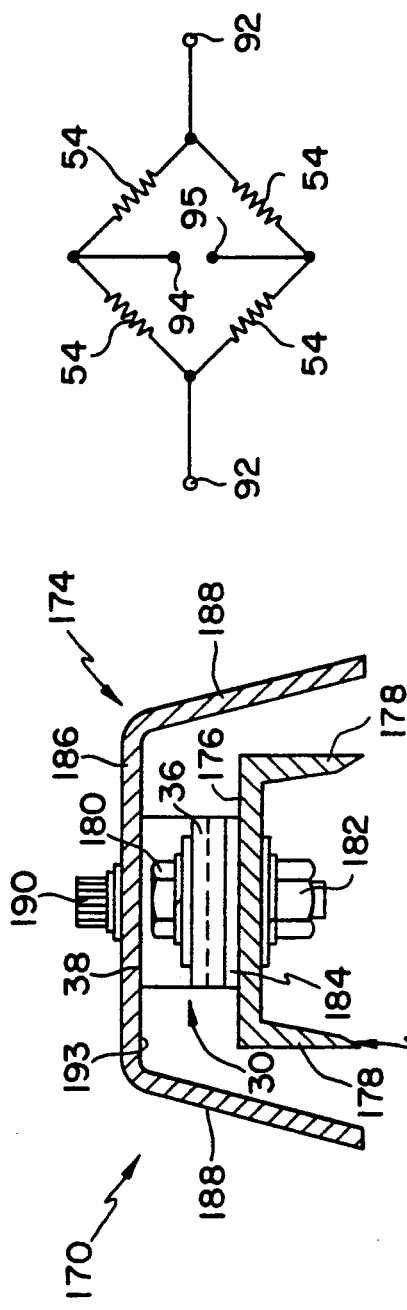
FIG.5
FIG.6
FIG.7

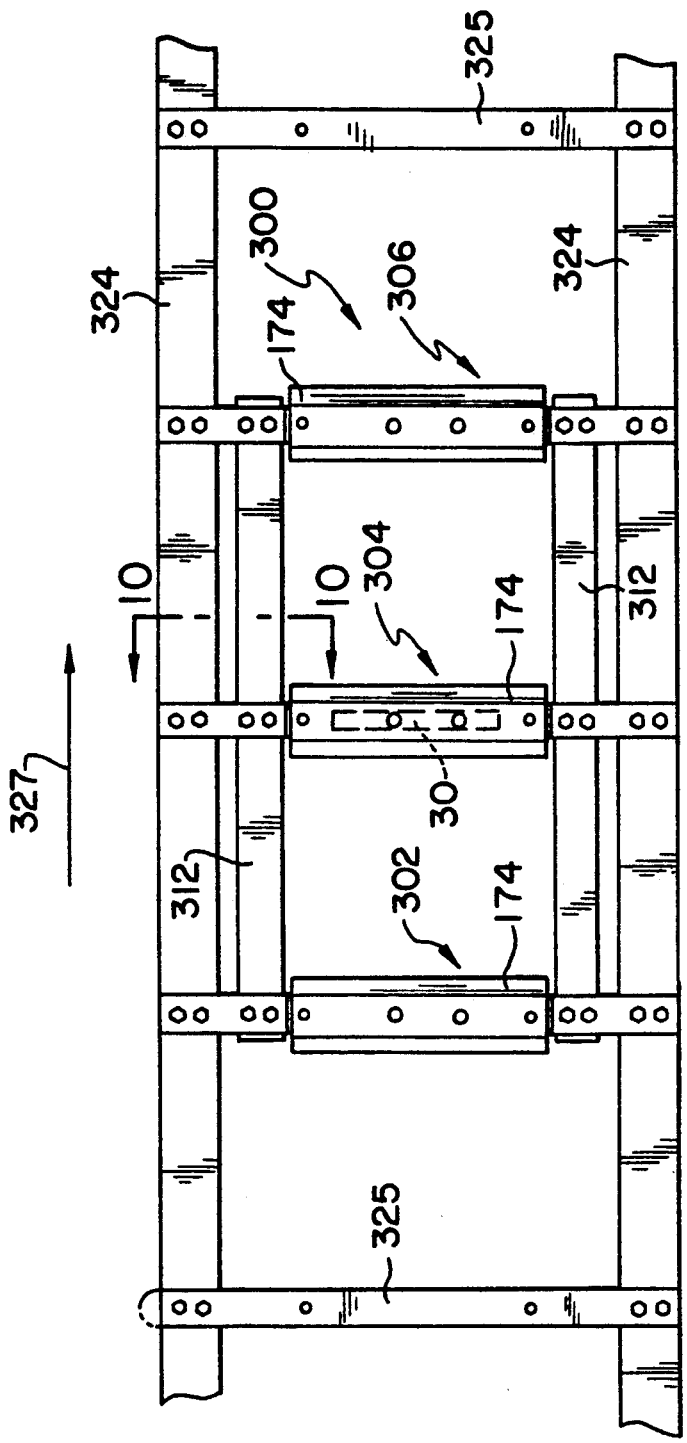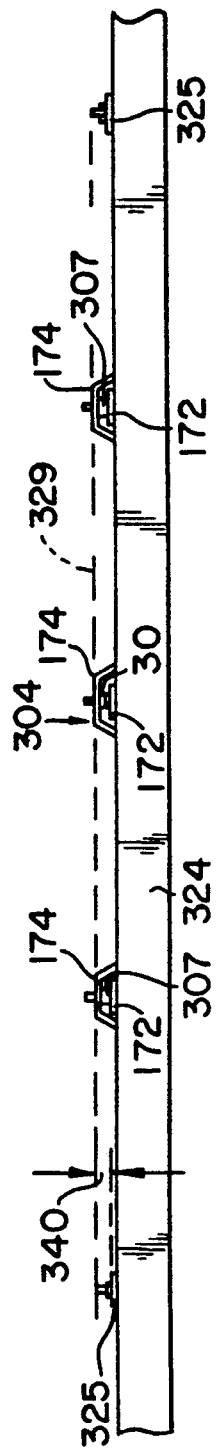
FIG.8
FIG.9

MODULAR IDLER STATION BELT SCALE APPARATUS

This application is a continuation-in-part application of copending U.S. patent application Ser. No. 07/878,836, filed May 5, 1992.

BACKGROUND AND SUMMARY OF THE INVENTION

The present invention relates generally to a scale apparatus for weighing materials moving on a conveyor belt. More particularly, the invention relates to a scale apparatus that can be easily incorporated into existing conveyor systems.

It is often desirable to measure the mass flow rate of material moving on a conveyor belt. By combining the weight of the material and the speed of the conveyor belt, a continuous indication of the mass flow rate of the material moving on the conveyor belt can be generated. Various types of devices are known for measuring the weight of material moving on a conveyor belt.

It is known to provide load cells situated below a conveyor belt to generate an output signal proportional to the weight of a load moving across a conveyor belt. See, for example, U.S. Pat. No. 3,478,830; U.S. Pat. No. 3,439,761; U.S. Pat. No. 3,785,447; U.S. Pat. No. 3,924,729; U.S. Pat. No. 4,682,664; U.S. Pat. No. 4,788,930; U.S. Pat. No. 4,463,816; and U.S. Pat. No. 4,557,341. Conventional belt scales are often large, bulky devices which are expensive and often hard to install. Therefore, many conventional belt scale devices are too expensive for many businesses to purchase and install. Smaller businesses also have a need for reliable measurement of the weight or mass flow of material on a conveyor. For instance, concrete facilities and farming or grain handling facilities often need to know the amount of material moving on a conveyor. The present invention provides an accurate yet inexpensive scale apparatus that can be easily incorporated into existing belt conveyor systems.

If the material carried by the conveyor approaches the load cell from a position above or below the load cell, the materials may impose a side load or torque on the load cell in addition to the loads in the vertical direction. Such side torque can cause the load cell to experience excessive wear and cause inaccuracies in the output of the load cell. Therefore, it is advantageous to arrange the load cell so that the conveyor belt is substantially level as the conveyor belt passes over the load cell. The present invention includes a modular scale unit that provides an aligned and pre-leveled load cell. The scale unit is easily installed in an existing conveyor frame.

According to the present invention, a scale apparatus is provided for weighing material moving on a conveyor belt supported by an idler assembly. The apparatus includes a load cell support and a load cell. The load cell includes a base and a contact portion extending upwardly away from the base. The base of the load cell is configured to bend in response to a vertical force being applied to the contact portion to generate an output signal proportional to the force. The load cell is non-responsive to horizontal forces. The belt scale apparatus also includes means for coupling the load cell to the load cell support and means for coupling the load cell support to a conveyor frame to suspend the load cell below the conveyor belt. The apparatus further includes an idler support for supporting the idler assembly and means for coupling the idler support to the contact portion of the load cell. The idler support applies a downwardly directed force to the contact portion of the load cell to bend the base of the load cell in response to material moving on the conveyor belt over the idler support to change the output signal generated by the load cell in proportion to the weight of the material. The magnitude of the force applied by the idler support changes as the weight of the material moving over the idler support changes.

In one embodiment of the invention, the load cell support is formed to include a central aperture therein for receiving the contact portion of the load cell therethrough. In another embodiment, the load cell support includes a top surface, and the means for coupling the load cell to the load cell support includes a first fastener for coupling a first end of the load cell to the top surface of the load cell support and a second fastener for coupling a second end of the load cell to the top surface of the load cell support. First and second shims are located between the load cell and the top surface of the load cell support adjacent the first and second ends of the load cell, respectively, to elevate the load cell above top surface of the load cell support to permit the base of the load cell to bend. The top surface of the load cell support is formed to include a recessed portion located below the load cell to permit further bending of the load cell.

According to another aspect of the invention, the idler support includes a top surface, a bottom surface, and an aperture extending between the top and bottom surfaces. A fastener extends through the aperture in the idler support for coupling the load cell to the bottom surface of the idler support. The bottom surface of the idler support is formed to include a recessed portion positioned over the contact portion of the load cell.

According to yet another aspect of the present invention, the base of the load cell is formed to include a plurality of notched sections therein to increase the flexibility of the base. The load cell includes a plurality of strain gauges. One strain gauge is located below each of the plurality of notched sections for generating the output signal in response to bending or deflection of the base.

According to still another aspect of the present invention, the belt scale apparatus further includes means for adjusting the level of the load cell support relative to the conveyor frame. The adjusting means preferably includes means for independently adjusting the level of a first end of the load cell support relative to a first side of the conveyor frame and a second end of the load cell support relative to a second side of the conveyor frame. In one embodiment, the means for coupling the load cell support to the conveyor frame includes a first coupler plate for coupling a first end of the load cell support to a first side of the conveyor frame and a second coupler plate for coupling a second end of the load cell support to a second side of the conveyor frame. The means for adjusting the level of the load cell support relative to the conveyor frame illustratively includes at least one shim configured to be selectively positioned between the first coupler plate and the first end of the load cell support, between the first coupler plate and the first side of the conveyor frame, between the second coupler plate and the second end of the load cell support, or between the second coupler plate and the second side of the conveyor frame. By selectively placing the shims, the position of the load cell idler station can be adjusted so that it is aligned with idler roller stations both upstream and downstream from the load cell idler station on the conveyor frame. The shims can be selectively placed either to raise or to lower the load cell support on either side of the attachment of the load cell support to the conveyor frame.

The belt scale apparatus of the present invention is easily installed into existing conveyor systems without substantial modification of the conveyor system. The present invention therefore advantageously provides an inexpensive yet accurate belt scale apparatus for weighing materials passing over the apparatus on a conveyor belt.

According a further aspect of the invention, a scale apparatus is provided for weighing material moving in a downstream direction on a conveyor belt supported by a conveyor frame. The apparatus includes an upstream idler station, a downstream idler station, and a measuring idler station situated between the upstream idler station and the downstream idler station. The apparatus also includes means for measuring the weight of material moving on the conveyor belt. The measuring means is coupled to the measuring idler station. The apparatus further includes means for coupling the upstream idler station, the measuring idler station, and the downstream idler station together to form a scale unit, and means for coupling the scale unit to the conveyor frame so that the conveyor belt passes over the upstream idler station, the measuring idler station, and the downstream idler station.

In the illustrated embodiment, the means for coupling the upstream idler station, the measuring idler station, and the downstream idler station together to form the scale unit includes first and second alignment bars coupled to opposite end portions of the upstream idler station, the measuring idler station, and the downstream idler station. The means for coupling the scale unit to the conveyor frame includes a first set of coupler plates for coupling a first side of the scale unit to a first side of the conveyor frame and a second set of coupler plates for coupling a second side of the scale unit to a second side of the conveyor frame.

Also in the illustrated embodiment, the measuring means includes a load cell coupled to the measuring idler station. The load cell includes a base and a contact portion extending upwardly away from the base. The base of the load cell is configured to bend in response to a force being applied to the contact portion to generate an output signal proportional to the force.

According to an additional aspect of the present invention, the measuring idler station includes a load cell support, means for coupling the load cell to the load cell support, an idler support for supporting an idler assembly thereon, and means for coupling the idler support to the contact portion of the load cell. The idler support applies a downwardly directed force to the contact portion of the load cell to bend the base of the load cell in response to material moving on the conveyor belt over the idler support to change the output signal generated by the load cell in proportion to the weight of the material.

According to another aspect of the present invention, the upstream idler station, the measuring idler station, and the downstream idler station each include a top surface for supporting an idler assembly thereon. The means for coupling the upstream idler station, the measuring idler station, and the downstream idler station together to form the scale unit aligns said top surfaces to lie substantially in a single plane.

In a second embodiment of the scale apparatus, the scale unit includes a second measuring idler station situated adjacent first measuring idler station and second means for measuring the weight of material moving along the conveyor belt. The second measuring means is coupled to the second measuring idler station. The apparatus further includes means coupled to the first and second measuring means for averaging the weight of material measured by the first and second measuring means.

By leveling the scale unit into a planar array of idler stations, the present invention provides a modular scale apparatus that reduces the occurrence of side torque forces on the measuring station and provides a more reliable and accurate scale apparatus. Furthermore, because the scale unit is a single preleveled and aligned unit, the modular scale apparatus of the present invention facilitates installation of the apparatus into an existing conveyor system.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 5 is a side elevational view with portions broken away illustrating a third embodiment of the conveyor belt scale apparatus of the present invention including an assembly for adjusting the level of the load cell support relative to the conveyor frame;

FIG. 6 is a sectional view taken along lines 6—6 of FIG. 5;

FIG. 7 is a diagrammatical electrical circuit diagram illustrating operation of the load cell of the present invention to generate the output signal;

FIG. 8 is a top plan view of a three element modular scale apparatus of the present invention coupled to a conveyor frame;

FIG. 9 is a side elevational view of the modular scale apparatus of FIG. 8;

DETAILED DESCRIPTION OF THE DRAWINGS

Figure 1:
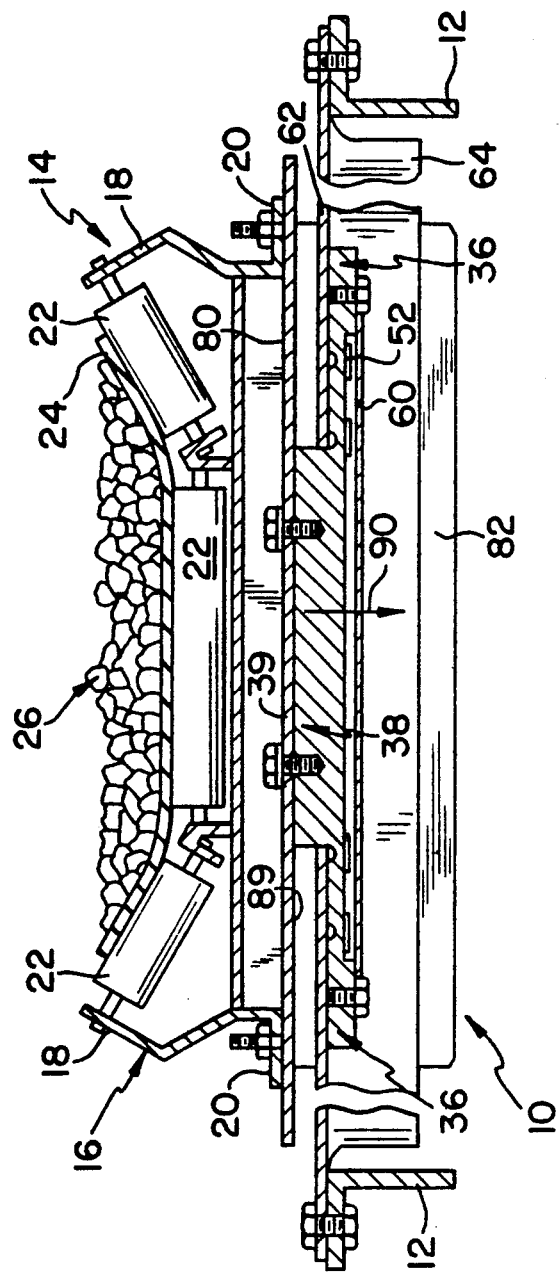
FIG. 1 is a sectional view taken through a conveyor belt scale apparatus of the present invention illustrating a load moving along a conveyor belt above a roller assembly which causes the conveyor belt scale apparatus to generate an output signal proportional to the weight of the load on the conveyor belt.

Referring now to the drawings, FIG. 1 illustrates the conveyor belt scale apparatus 10 of the present invention. Belt scale apparatus 10 is situated between opposite sides of conveyor frame 12. An idler roller assembly 14 is coupled to belt scale apparatus 10. Illustratively, idler roller assembly 14 includes a frame 16 having end brackets 18, a generally flat base portion 20, and three idler rollers 22. Idler rollers 22 support a conveyor belt 24 for transporting a load or material 26 in a conventional manner. It is understood that other types of conveyor systems and idler roller assemblies may be used in accordance with the present invention.

Figure 3:
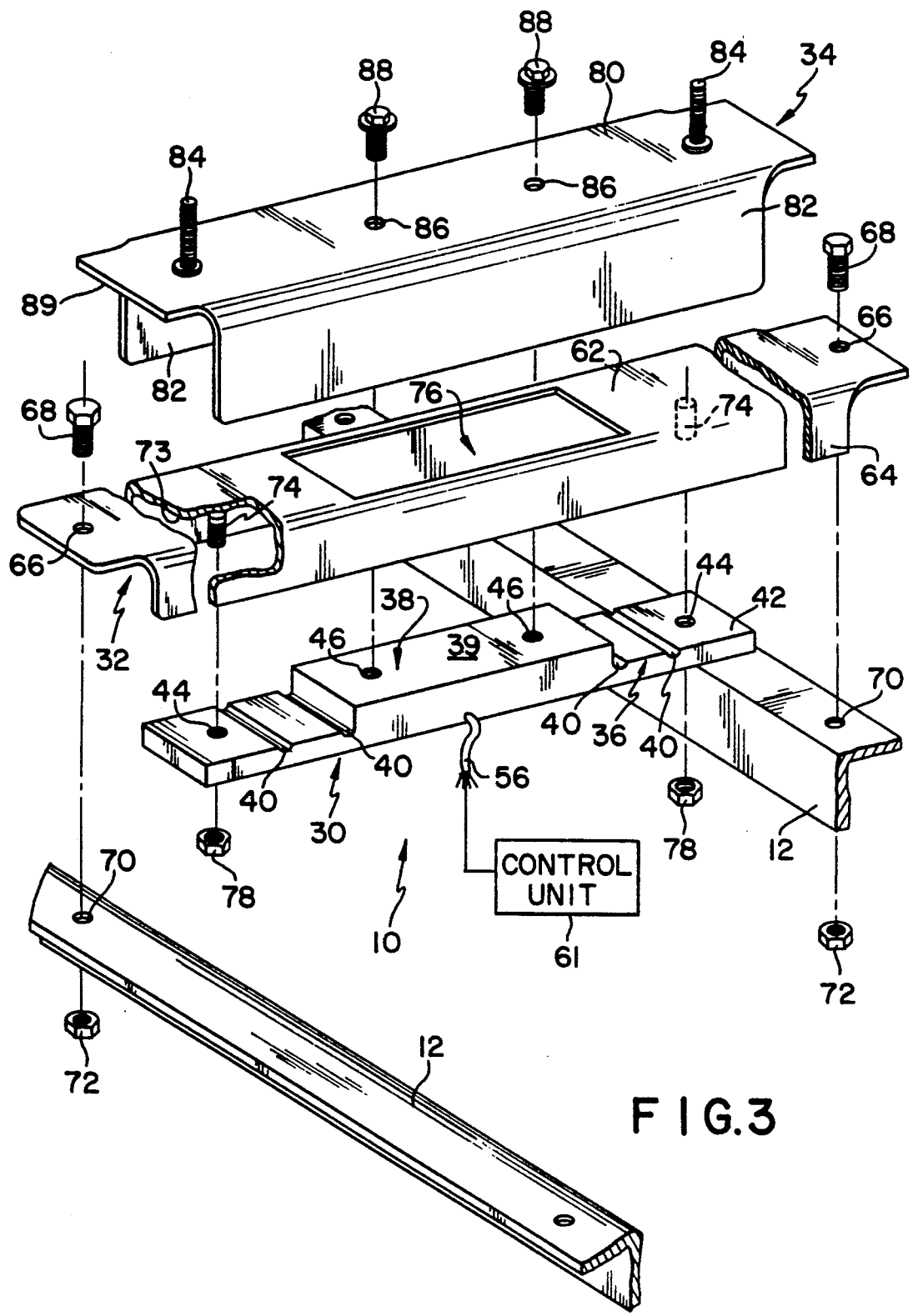
FIG. 3 is an exploded perspective view of the belt scale apparatus illustrated in FIG. 1, further illustrating the load cell, a load cell support, and an idler support.

The configuration of the belt scale apparatus 10 is best illustrated in FIG. 3. Belt scale apparatus 10 includes a load cell 30, a load cell support 32, and an idler support 34. Load cell 30 includes a generally rectangular body portion or base 36 and an elevated central contact portion 38 extending upwardly from base 36. Contact portion 38 includes a top contact surface 39. Four cut-outs or notched sections 40 are formed in a top surface 42 of base 36. Apertures 44 are formed at opposite ends of load cell 30. Threaded apertures 46 are formed in contact portion 38 of load cell 30.

Figure 2:
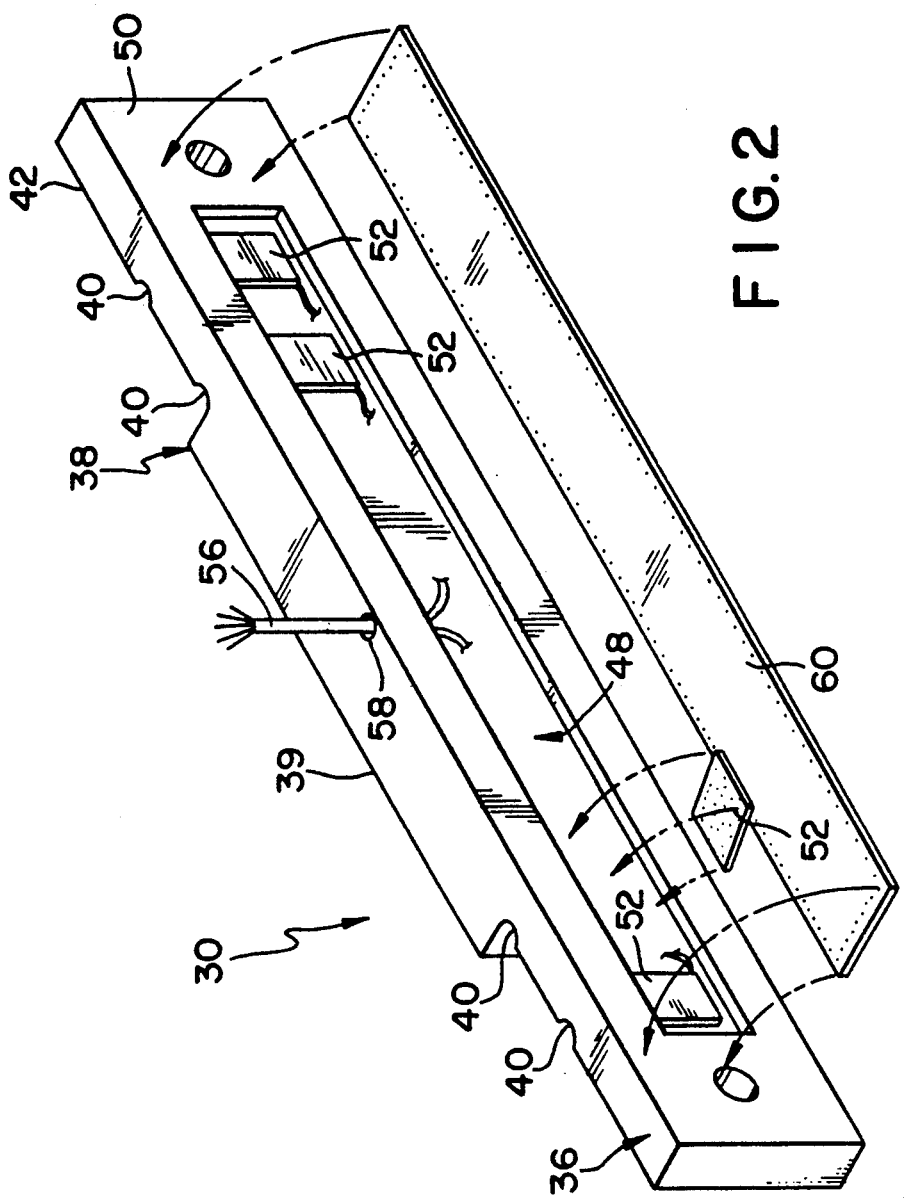
FIG. 2 is a perspective view of a load cell of the present invention illustrating the configuration of strain gauges mounted within the load cell for generating the output signal.

As illustrated in FIG. 2, load cell 30 also includes a recessed section 48 formed in a bottom surface 50 of base 36. Four strain gauges 52 are secured to the load cell 30 inside recessed section 48. Each strain gauge 52 is located below a notched section 40 formed in top surface 42 of base 36. Strain gauges 52 are electrically coupled together to form a bridge circuit arrangement as illustrated diagrammatically in FIG. 7. In FIG. 7, variable resistors 54 represent strain gauges 52 in load cell 30. As discussed in detail below, strain gauges 52 provide an output signal on wire 56 which extends through an aperture 58 formed in load cell 30. A cover plate 60 is secured to bottom surface 50 of load cell 30 after strain gauges 52 are secured in the proper position inside recessed section 48 of load cell 30. Load cell 30 is coupled to control unit 61 (FIG. 3) which processes the output signal from wire 56 in a conventional manner. A mass flow rate of the material 26 (FIG. 1) can be determined by multiplying the weight of material indicated by the load cell 30 output signal by the velocity of the conveyor belt 24 which can be input to control unit 61 from a conventional velocity sensor (not shown).

The size and depth of notched sections 40 varies depending on the desired flexibility of the base 36 and the amount of range desired. For instance, if relatively light weight material is to be weighed, notched sections 40 would be cut deeper to provide more flexibility. If relatively heavy material is to be weighed, notched sections 40 are cut less deep. Preferably load cell 30 is an LO-10 double-ended beam type load cell available from Lorenz Messtechnik GmbH in Alfdorf, Germany.

Referring again to FIG. 3, load cell support 32 includes a top surface 62 and side flanges 64. Top surface 62 is formed to include apertures 66 at opposite ends of load cell support 32. A suitable fastener such as bolt 68 is inserted through aperture 66 and through an aperture 70 formed in conveyor frame 12 to secure load cell support 32 to conveyor frame 12. A nut 72 is fastened on bolts 68. Load cell support 32 includes threaded studs 74 which are welded to a bottom surface 73 of load cell support 32. Studs 74 are spaced apart a distance equal the spacing of apertures 44 formed in load cell 30. Load cell support 32 is also formed to include an aperture 76 for receiving the contact portion 38 of load cell 30 therethrough. Studs 74 are inserted through apertures 44 of the load cell 30. Nuts 78 are then threaded onto studs 74 to secure load cell 30 to load cell support 32. As best illustrated in FIG. 1, contact portion 38 extends through aperture 76 to lie above top surface 62 of load cell support 32. Therefore, opposite ends of base 36 are secured to the load cell support 32. A middle portion of base 36 below contact portion 38 is free to move. Therefore, a force applied to contact portion 38 causes base 36 to bend or deflect downwardly.

Idler support 34 includes a top surface 80 and side flanges 82. Threaded studs 84 are welded to top surface 82 of idler support 34. Threaded studs 84 are used to couple idler roller assembly 14 to idler support 34 as illustrated in FIG. 1. Idler support 34 is also formed to include apertures 86 which are spaced apart the same distance as apertures 46 in contact portion 38 of load cell 30. Threaded fasteners 88 extend through apertures 86 and into threaded apertures 46 of load cell 30 to couple idler support 34 to load cell 30. A bottom surface 89 of idler support 34 abuts contact surface 39 of contact portion 38 of load cell 30.

As illustrated in FIG. 1, movement of material 26 over idler roller assembly 14 on conveyor 24 creates a downwardly-directed force in the direction of arrow 90 on idler support 34. Because bottom surface 89 of idler support 34 only abuts contact surface 39 of load cell 30 the downwardly-directed force in the direction of arrow 90 on idler support 34 is transferred directly to contact portion 38 of load cell 30. This causes deflection or bending of the base 36 of load cell 30 in the direction of arrow 90 as the material 26 moves over idler roller assembly 14.

Strain gauges 52 provide a variable resistance depending upon the amount of deflection or bending which occurs in base 36 of load cell 30. Strain gauges 52 are electrically coupled into a bridge circuit such as illustrated in FIG. 7. A voltage is applied across terminals 92. When no weight is applied to contact portion 38 of load cell 30, the bridge is balanced to give zero output at terminals 94 and 95. If weight from material 26 is applied to contact portion 38 of load cell 30, base 36 of load cell 30 is deflected to bend strain gauges 52. This causes the resistance of each strain gauge 52 to change. Therefore, the bridge becomes unbalanced and an output voltage signal which is substantially proportional to the applied weight to load cell 30 appears across terminals 94 and 95. This output signal is transmitted over wire 56 to control unit 61 as discussed above.

Figure 4:
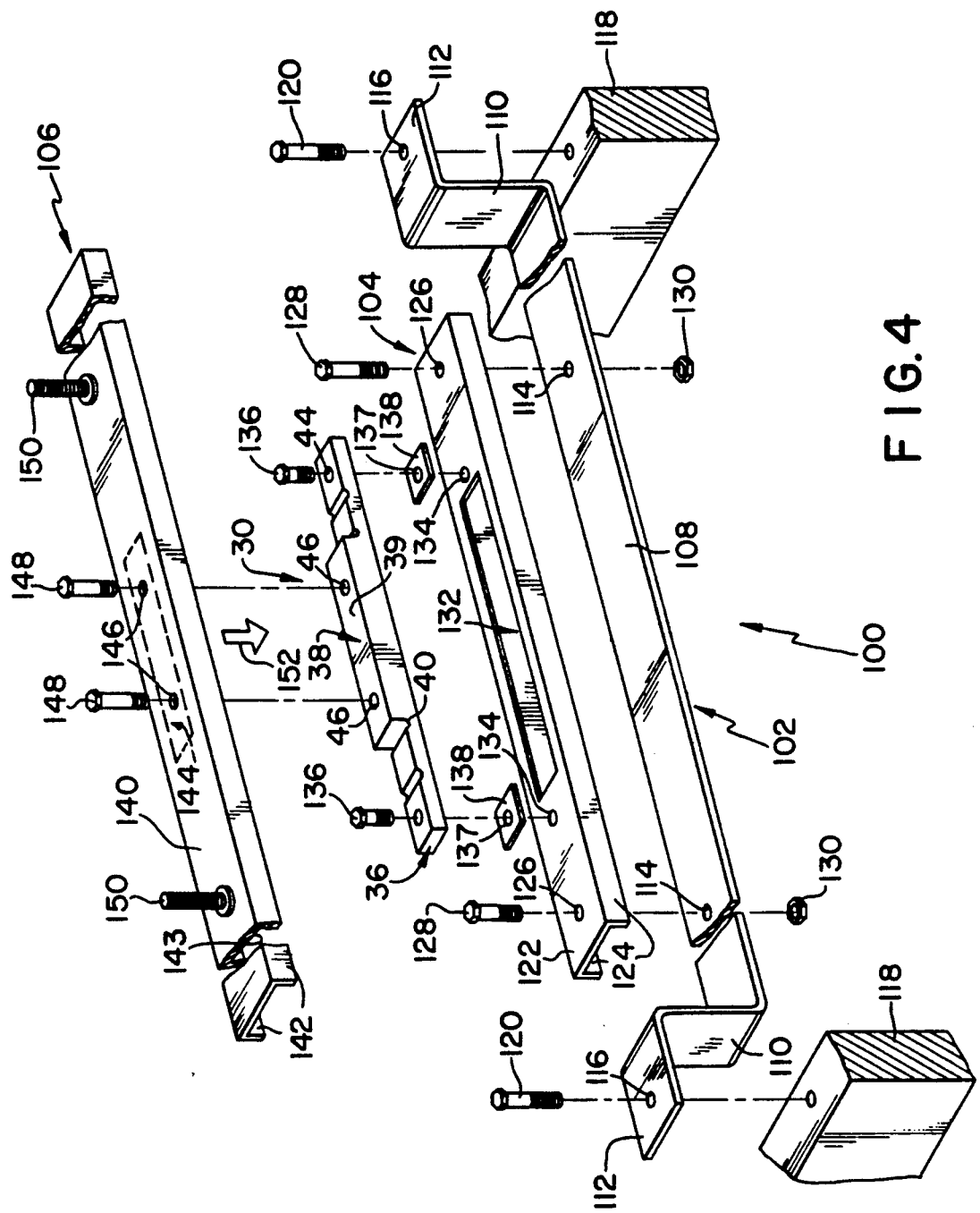
FIG. 4 is an exploded perspective view of a second embodiment of the conveyor belt scale apparatus of the present invention.

A second embodiment of the present invention is illustrated in FIG. 4. In this embodiment, the belt scale apparatus 100 includes a belt scale support 102, a load cell support 104, load cell 30 and an idler support 106. Belt scale support 102 includes a base section 108, upwardly extending sides 110 and flanges 112 located at opposite ends of belt scale support 102. Flanges 112 are generally parallel to base section 108. Base section 108 is formed to include apertures 114 therein for securing load cell support 104 to belt scale support 102. Each of the flanges 112 is also formed to include an aperture 116 for securing belt scale support 102 to the conveyor frame 118 with suitable fasteners 120. Belt scale support 102 is configured to align idler support 106 with a top surface of conveyor frame 118.

Load cell support 104 includes a top 122 and side flanges 124. Load cell support 104 also includes a first pair of apertures 126 extending through top 122. Fasteners such as bolts 128 extend through apertures 126 in load cell support 104 and through apertures 114 in belt scale support 102. Nuts 130 are then threaded onto bolts 128 to secure load cell support 104 to belt scale support 102. A counter sink or recessed portion 132 is formed on top 122 of load cell support 104. Recessed portion 132 does not extend completely through top 122. Load cell support 104 is formed to include a second pair of apertures 134 which extend through top 122.

Load cell 30 used in the second embodiment illustrated in FIG. 4 is the same load cell 30 used in the first embodiment illustrated in FIGS. 1-3. Fasteners 136 extend through apertures 44 in load cell 30, through an aperture 137 in a shim 138, and through aperture 134 in load cell support 104. Nuts are then threaded onto bolts 136 to secure load cell 30 to load cell support 104. Shims 138 elevate bottom surface 50 of load cell 30 above top 122 of load cell support 104 to permit deflection of load cell 30 when a force is applied to contact surface 39. Recessed section 132 permits further deflection of base 36 of load cell 30. Shims 138 are made from a material which is insensitive to temperature changes and does not expand or contract substantially over a wide range of temperatures. Therefore, the position of load cell 30 relative to load cell support 104 does not change substantially as the temperature changes. Accordingly, the position of idler support 106 remains substantially level with upstream and downstream idler stations despite temperature fluctuations.

Idler support 106 includes a top surface 140 and side flanges 142. A bottom surface 143 of idler support 106 is formed to include a counter sink or recessed section 144 as illustrated by dotted lines in FIG. 4. Recessed section 144 is designed to receive contact surface 39 of load cell 30 therein to position load cell 30 relative to idler support 106. Top surface 140 of idler support 106 is formed to include a pair of apertures 146 spaced apart by a distance equal to the distance by separation of apertures 46 in contact portion 38 of load cell 30. Threaded fasteners 148 extend through apertures 146 in idler support 106 and into threaded apertures 46 of load cell 30 to secure idler support 106 to load cell 30. Therefore, bottom surface 143 abuts contact surface 39 of load cell 30.

An idler roller assembly such as idler roller assembly 14 in FIG. 1 is coupled to idler support 106 by threaded studs 150 welded to top surface 140 of idler support 106. As material 26 on a conveyor belt passes over idler support 106, idler support 106 applies a downwardly directed force on contact portion 38 in the direction of arrow 152 in FIG. 4. Because idler support 106 rests only upon contact surface 39 of load cell 30, base 36 of load cell 30 is deflected by the weight of the material passing on the conveyor belt and the idler roller assembly located above idler support 106. Such deflection of load cell 30 causes strain gauges 52 to provide an output signal proportional to the weight of the material passing over belt scale apparatus 100 in a manner discussed above in reference to FIGS. 1-3.

A third embodiment of the present invention is illustrated in FIGS. 5 and 6. The belt scale apparatus 170 includes a load cell support 172, a load cell 30 identical to the load cell illustrated in FIGS. 1-4, and an idler support 174. Load cell support 172 includes a top 176 and side flanges 178 extending downwardly from top 176. Load cell 30 is coupled to top 176 of load cell support 172 by bolts 180 and nuts 182. A shim 184 is located between load cell 30 and top 176 of load cell support 172 at each end of load cell 30 so that the bottom surface 50 of load cell 30 is spaced apart from top 176 of load cell support 172. This permits deflection or bending of load cell 30. Shims 184 are made from a material that is insensitive to temperature changes and does not expand or contract substantially over a wide range of temperatures. Therefore, the position of load cell 30 relative to load cell support 172 does not change substantially as the temperature changes. Accordingly, the position of idler support 174 remains substantially level with upstream and downstream idler stations despite temperature fluctuations.

Idler support 174 includes a top 186 and downwardly extending side flanges 188. Threaded fasteners 190 extend through apertures 192 formed in top 186 and into threaded apertures 46 of load cell 30 to couple idler support 176 to load cell 30. Therefore, a bottom surface 193 of idler support 174 abuts contact surface 39 of load cell 30.

Coupler plates 194 and 195 are provided to couple belt scale apparatus 170 to first and second sides 196 and 198 of a conveyor frame. Belt scale apparatus 170 is especially useful in situations in which first side 196 of conveyor frame is positioned at a level different from second side 198 of conveyor frame. In FIG. 5, horizontal flange 197 of first side 196 is located at a first level illustrated by L1 and horizontal flange 199 of second side 198 of conveyor frame is situated at a second level illustrated by level L2. Coupler plate 194 is coupled to horizontal flange 197 by bolts 200 and nuts 202. Coupler plate 195 is coupled to horizontal flange 199 by bolts 204 and nuts 206. Coupler plates 194 and 195 are coupled to opposite ends of load cell support 172 by bolts 208 and nuts 210. A spacer plate 212 is situated between coupler plates 194 and 195 and top 176 of load cell support 72 at each end of load cell support 172.

It is desirable that the load cell idler station is aligned with idler assemblies or stations both upstream and downstream from the load cell idler station on conveyor frame. An unlevel load cell idler station can cause load cell 30 to generate inaccurate output signals. Belt scale apparatus 170 includes six shim areas which permit the level of load cell 30 to be adjusted. Shim areas are located between coupler plate 194 and horizontal flange 197 of first side 196 of the conveyor frame, between spacer plate 212 and coupler plates 194 and 195 at each end of load cell support 172, between top surface 176 and spacer plate 212 at each end of load cell support 172, and between coupler plate 195 and horizontal flange 199 of second side 198 of the conveyor frame. A shim can be placed in any of these six shim areas to adjust the position of load cell support 172 and load cell 30 relative to the conveyor frame. In the FIG. 5 illustration, horizontal flange 197 is located at a first level L1 which is lower than the level L2 of second horizontal flange 199. Therefore, a shim 214 is positioned between coupler plate 194 and horizontal flange 197 to elevate the position of coupler plate 194 and the end of load cell support 172 adjacent first side 196 of the conveyor frame. In addition, a shim 216 is positioned between coupler plate 195 and spacer plate 212 adjacent second side 198 of the conveyor frame. This lowers the end of load cell support 172 adjacent second side 198 of the conveyor frame. By adding shims 214 and 216, contact surface 39 of load cell 30 is substantially level, despite the different levels of horizontal flanges 197 and 199. If necessary, an additional shim (not shown) can be added between spacer plate 212 and top 176 of load cell support 172 adjacent second side 198 to lower the end of load cell support 172 adjacent second side 198 further.

If first horizontal flange 197 is at a higher level than second horizontal flange 199, a shim would be added between coupler plate 195 and horizontal flange 199 to raise the level of load cell support 172 adjacent second end 198. In addition, shims could be added between coupler plate 194 and spacer plate 212 and between spacer plate 212 and top 176 of load cell support 172 adjacent first side 196. This would lower the end of load cell support 172 adjacent first side 196 of the conveyor frame to level contact surface 38 of load cell 30.

An idler roller assembly such as assembly 14 illustrated in FIG. 1 is coupled to idler support 174 by threaded studs (not shown) welded to top 186 of idler support 174. When material moves on a conveyor belt over idler roller assembly, idler support 174 applies a force in the direction of arrow 218 on load cell 30. Because load cell 30 is spaced apart from top 176 of load cell support 172 by shims 184, the force in the direction of arrow 218 causes deflection of base 36 of load cell 30. This deflection causes the resistance of strain gauges 52 to change which, in turn, causes an output signal from load cell 30 to change in proportion to the weight of the material passing over the idler roller assembly above idler support 174 as discussed in detail with reference to FIGS. 1-3.

It is understood that the various components of the three illustrated embodiments may be interchanged if desired. For example, the adjustment coupling apparatus illustrated in FIG. 5 could be used in either of the first two embodiments.

Figure 10:
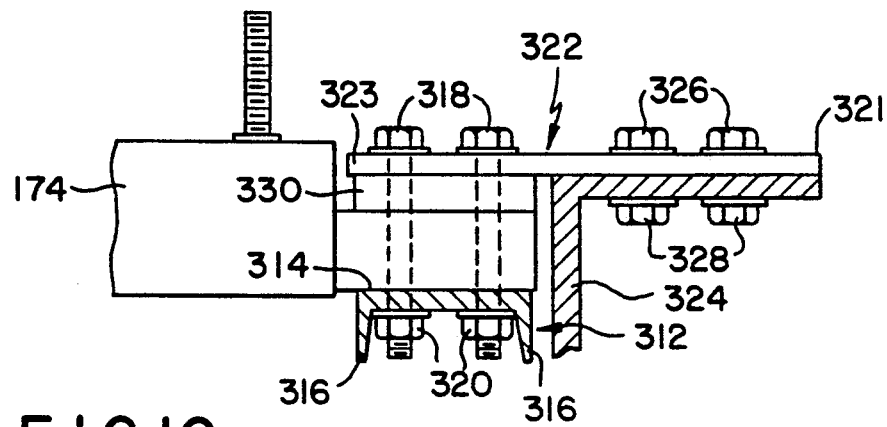
FIG. 10 is a sectional view taken along lines 10—10 in FIG. 8 illustrating the details of the modular scale apparatus.

A modular belt scale apparatus 300 is illustrated in FIGS. 8-10. Modular belt scale apparatus 300 is designed to be coupled between opposite sides of conventional conveyor frame 324 to replace conveyor frame cross supports 325. Modular belt scale apparatus 300 includes a measuring idler station 304 disposed in parallel, spaced apart relation between an upstream dummy idler station 302 and a downstream dummy idler station 306. A pair of alignment bars 312 are coupled to all three idler stations 302, 304 and 306. Modular belt scale apparatus 300 is coupled to conveyor frame 324 so that material moving along the conveyor belt 24 passes sequentially over upstream idler station 302, measuring idler station 304, and downstream idler station 306 in a downstream direction illustrated by arrow 327.

Idler stations 302, 304, 306 each includes a load cell support 172 and an idler support 174 identical to those illustrated in belt scale apparatus 170 illustrated in FIGS. 5-6. Each idler support 174 is configured to receive an idler assembly such as idler assembly 14 illustrated in FIG. 1 thereon for supporting conveyor belt 24. Measuring idler station 304 includes a load cell 30 identical to load cell 30 in belt scale apparatus 170 for measuring the weight of material passing over measuring idler station 304 on conveyor belt 24. Upstream and downstream idler stations 302 and 306 each include a dummy load cell 307 that is made of a solid block of material having the same size and shape as load cell 30. Preferably, the dummy load cells 307 are constructed from the same metal used to make load cell 30. Therefore, with the exception of the weight sensing capability of measuring idler station 304, dummy idler stations 302 and 306 are substantially identical to measuring idler station 304.

Alignment bars 312 are disposed in parallel, spaced-apart relation relative to each other and are oriented substantially perpendicularly to idler stations 302, 304, 306. As illustrated in FIG. 10, alignment bars 312 include a top 314 and side flanges 316 extending downwardly from top 314. Load cell supports 172 of idler stations 302, 304, 306 are coupled to top 314 of alignment bars 312 by bolts 318 and nuts 320.

By coupling the idler stations 302, 304, 306 to alignment bars 312 to form a scale unit, the present invention ensures that all of the top surfaces of idler supports 174 of the idler stations 302, 304, 306 lie in the substantially same plane as illustrated by line 329 in FIG. 9. By arranging the idler stations 302, 304, 306 in a substantially planar arrangement, the modular belt scale apparatus 300 can be coupled as a scale unit to conveyor frame 324. Because idler stations 302, 304 and 306 are substantially level relative to each other, material passing over modular belt scale apparatus 300 is also substantially level. This reduces side load forces imposed on load cell 30 of measuring idler station 304 from material moving along conveyor belt 24. Any side load forces are substantially absorbed by upstream and downstream idler stations 302 and 306. Reduction of side load forces on measuring idler station 304 provides more accurate measurements from load cell 30 of measuring idler station 304 since there are substantially no horizontal components to the force directed against load cell 30 of measuring idler station 304. As illustrated in FIG. 9, scale unit of scale apparatus 300 is located at a height slightly above the height of other cross supports 325 of conveyor frame 324 by a predetermined distance illustrated by dimension 340. Illustratively, dimension 340 is about 1-2 inches.

As illustrated in FIG. 10, scale apparatus 300 is attached to conveyor frame 324 by coupler plates 322. Distal ends 321 of coupler plates 322 are coupled to conveyor frame 324 by bolts 326 and nuts 328. Proximal ends 323 of coupler plates 322 are coupled to alignment bars 312 and to idler stations 302, 304, 306 by bolts 318 and nuts 320. If required, shims 330 can be inserted between load cell support 172 and coupler plate 322 to adjust the height of one side of modular belt scale apparatus 300 relative to the other side. As illustrated in FIG. 8, a first set of coupler plates 322 are provided for coupling a first side of scale apparatus 300 to a first side of conveyor frame 324. A second set of coupler plates 322 are provided for coupling a second side of scale apparatus 300 to a second side of conveyor frame 324.

Figure 11:
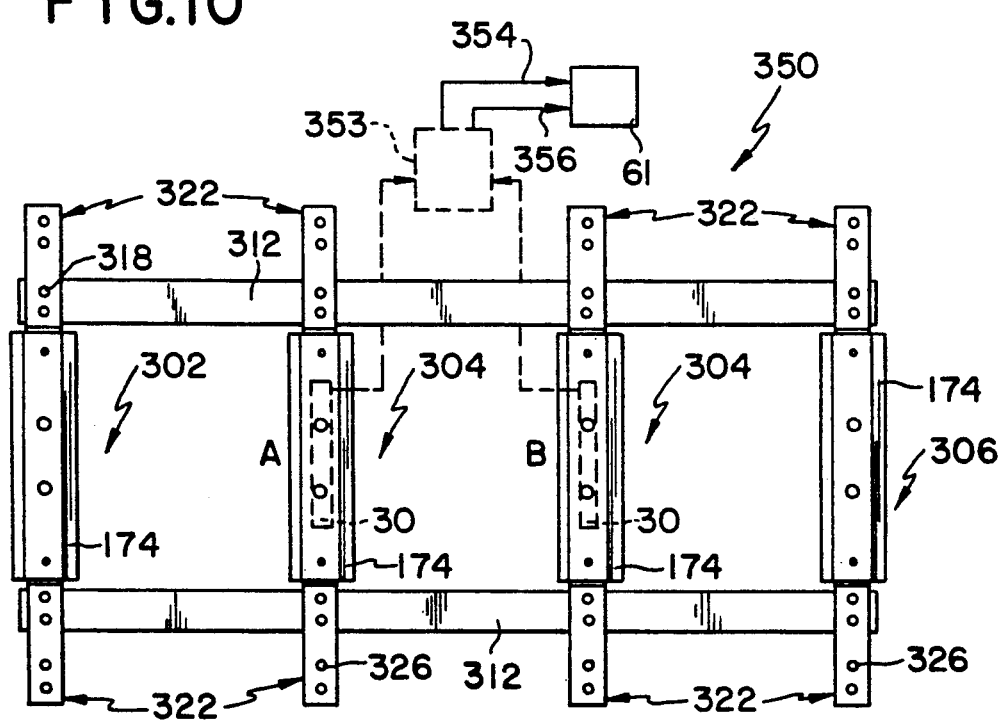
FIG. 11 is a plan view of a four element modular scale apparatus illustrated without the conveyor frame.

A second embodiment of the modular scale apparatus is illustrated in FIG. 11. Scale apparatus 350 includes two measuring idler stations 304 located between two dummy idler stations 302, 306. Load cells 30 of the two measuring idler stations 304 are coupled together to provide an averaged signal to a control unit 61 as illustrated diagrammatically by dotted line 353, thereby providing a more accurate measurement of the weight of material passing over the two measuring idler stations 304. Control unit 61 processes the output signal in a conventional manner. The assembly 350 is essentially identical to assembly 300 of FIGS. 8-10 in all other aspects.

Figure 12:
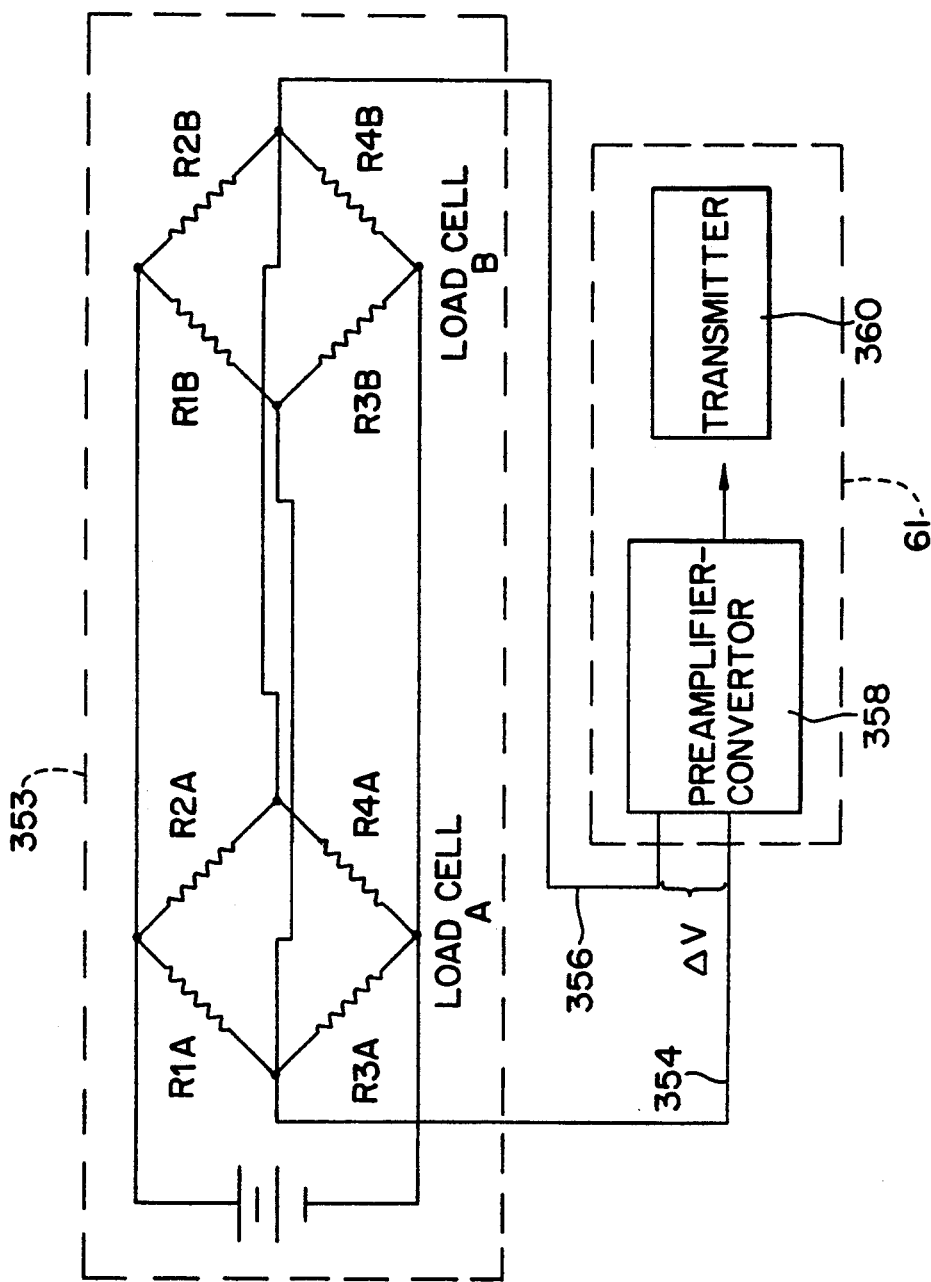
FIG. 12 is a schematic diagram illustrating the wiring arrangement for averaging the outputs of two load cells.

Details of the wiring diagram of the two load cells 30 are illustrated in FIG. 12. The two measuring idler stations 304 include a first load cell A and a second load cell B. The averaging of the two load cell signals is accomplished by connecting all like leads of the two load cells A and B together so that the load cells A and B share a common power supply and each resistor leg of one load cell A is connected in parallel with the like resistor leg of the second load cell B. The resistor legs are the strain gauges of load cells A and B as discussed above. For instance, resistor R1A is coupled in parallel with resistor R1B, etc. Therefore, load cells A and B appear as a single load cell serving two separate physical locations with only one output generated by two wires 354 and 356. Wires 354 and 356 are coupled to a preamplifier converter 358 of control unit 61 which is coupled to a transmitter 360. By coupling load cells A and B together as illustrated in FIG. 12, the output of load cells A and B can be treated and processed in a manner identical to the manner in which a single load cell output is processed. The wiring configuration of FIG. 12 provides means for averaging the weights measured by the first and second load cells A and B.

Although the invention has been described in detail with reference to certain preferred embodiments, variations and modifications exist within the scope and spirit of the invention as described and defined in the following claims.

We claim:

1. A scale apparatus for weighing material moving in a downstream direction on a conveyor belt supported by a conveyor frame, the apparatus comprising:
   a nonmeasuring upstream idler station;
   a nonmeasuring downstream idler station;
   a measuring idler station situated between the upstream idler station and the downstream idler station;
   means for measuring the weight of material moving on the conveyor belt, the measuring means being coupled to the measuring idler station;
   means for coupling the upstream idler station, the measuring idler station, and the downstream idler station together to form a scale unit, the upstream idler station, the measuring idler station, and the downstream idler station each having a top surface for supporting an idler assembly thereon, the means for coupling the upstream idler station, the measuring idler station, and the downstream idler station together to form the scale unit configured to align the top surface of the upstream idler station, the measuring idler station, and the downstream idler station substantially in a single plane; and
   means for coupling the scale unit to the conveyor frame so that the conveyor belt passes over the upstream idler station, the measuring idler station, and the downstream idler station.

2. The apparatus of claim 1, wherein the means for coupling the upstream idler station, the measuring idler station, and the downstream idler station together to form the scale unit includes first and second alignment bars coupled to opposite end portions of the upstream idler station, the measuring idler station, and the downstream idler station.

3. The apparatus of claim 2, wherein the means for coupling the scale unit to the conveyor frame includes a first set of coupler plates for coupling a first side of the scale unit to a first side of the conveyor frame and a second set of coupler plates for coupling a second side of the scale unit to a second side of the conveyor frame.

4. The apparatus of claim 1, wherein the measuring means includes a load cell coupled to the measuring idler station.

5. The apparatus of claim 4, wherein the load cell includes a base and a contact portion extending upwardly away from the base, the base of the load cell being configured to bend in response to a force being applied to the contact portion to generate an output signal proportional to the force.

6. The apparatus of claim 5, wherein the base of the load cell is formed to include a plurality of notched sections therein to increase the flexibility of the base.

7. The apparatus of claim 5, wherein the measuring idler station includes a load cell support, means for coupling the load cell to the load cell support, an idler support for supporting an idler assembly thereon, and means for coupling the idler support to the contact portion of the load cell, the idler support applying a downwardly directed force to the contact portion of the load cell to bend the base of the load cell in response to material moving on the conveyor belt over the idler support to change the output signal generated by the load cell in proportion to the weight of the material.

8. The apparatus of claim 1, further comprising a second measuring idler station situated adjacent first measuring idler station, second means for measuring the weight of material moving along the conveyor belt, the second measuring means being coupled to the second measuring idler station, and means coupled to the first and second measuring means for averaging the weight of material measured by the first and second measuring means.

9. A scale apparatus for weighing material moving in a downstream direction on a conveyor belt supported by a conveyor frame, the apparatus comprising:
   an upstream idler station;
   a downstream idler station;
   a measuring idler station situated between the upstream idler station and the downstream idler station, the measuring idler station including a load cell support, a load cell coupled to the load cell support for generating an output signal proportional to the weight of material passing over the load cell on the conveyor belt, and an idler support coupled to the load cell for supporting an idler assembly thereon, the idler support including a bottom surface abutting the load cell so that the idler support applies a force to the load cell as the material moves on the conveyor belt over the idler support to generate the output signal proportional to the weight of the material;
   means for coupling the measuring idler station to the upstream idler station and to the downstream idler station to form a scale unit; and
   means for coupling the scale unit to the conveyor frame to suspend the scale unit below the conveyor belt so that the conveyor belt passes over the upstream idler station, the measuring idler station, and the downstream idler station.

10. The apparatus of claim 9, wherein the load cell includes a generally rectangular base and a contact portion extending upwardly from the base, the base of the load cell being configured to bend in response to a force being applied to the contact portion by the idler support, thereby generating the output signal.

11. The apparatus of claim 10, wherein the load cell includes a top surface, and further comprising a first fastener for coupling a first end of the load cell to the top surface of the load cell support, a second fastener for coupling a second end of the load cell to the top surface of the load cell support, and first and second shims located between the load cell and the top surface of the load cell support adjacent the first and second ends of the load cell, respectively, to elevate the load cell above top surface of the load cell support to permit the base of the load cell to bend.

12. The apparatus of claim 11, wherein the top surface load cell support is formed to include a recessed portion located below the load cell to permit further bending of the load cell.

13. The apparatus of claim 10, wherein the base of load cell is formed to include a plurality of notched sections therein to increase flexibility of the base.

14. The apparatus of claim 13, wherein the load cell includes a plurality of strain gauges, one strain gauge being located below each of the plurality of notched sections for generating the output signal in response to bending of the base.

15. The apparatus of claim 9, wherein the means for coupling the scale unit to the conveyor frame includes a first set of coupler plates for coupling a first side of the scale unit to a first side of the conveyor frame and a second set of coupler plates for coupling a second side of the scale unit to a second side of the conveyor frame.

16. The apparatus of claim 9, wherein the upstream station, the measuring idler station, and the downstream idler station each include a top surface for supporting an idler assembly thereon, and the means for coupling the upstream idler station, the measuring idler station, and the downstream idler station together to form the scale unit aligns said top surfaces to lie substantially in a single plane.

17. A scale apparatus for weighing material moving in a downstream direction on a conveyor belt supported by a conveyor frame, the apparatus comprising:
a plurality of idler stations including a nonmeasuring upstream idler station, a nonmeasuring downstream idler station, and a measuring idler station situated between the upstream idler station and the downstream idler station, each idler station including a top surface for supporting an idler assembly thereon;
means for coupling the plurality of idler stations together to form a scale unit, the coupling means aligning the top surface of the plurality of idler stations to lie substantially in a single plane;
means for coupling the scale unit to the conveyor frame so that the conveyor belt passes over the plurality of idler stations; and
means for measuring the weight of material moving along the conveyor belt, the measuring means being coupled to the measuring idler station so that the measuring means generates an output signal proportional to the weight of material passing over the measuring idler station on the conveyor belt.

18. The apparatus of claim 17, wherein the means for coupling the plurality of idler stations together to form the scale unit includes first and second alignment bars coupled to opposite end portions of each of the plurality of idler stations.

19. The apparatus of claim 17, wherein the means for coupling the scale unit to the conveyor frame includes a first set of coupler plates for coupling a first side of the scale unit to a first side of the conveyor frame and a second set of coupler plates for coupling a second side of the scale unit to a second side of the conveyor frame.

20. The apparatus of claim 17, the wherein the measuring means includes a load cell coupled to the measuring idler station.

21. The apparatus of claim 20, wherein the load cell includes a base and a contact portion extending upwardly away from the base, the base of the cell being configured to bend in response to a force being applied to the contact portion to generate an output signal proportional to the force.

22. The apparatus of claim 21, wherein the base of the load cell is formed to include a plurality of notched sections therein to increase flexibility of the base.

23. The apparatus of claim 21, wherein the measuring idler station includes a load cell support, means for coupling the load cell to the load cell support, an idler support for supporting an idler assembly, and means for coupling the idler support to the contact portion of the load cell so that the idler support applies a downwardly directed force to the contact portion of the load cell to bend the base of the load cell in response to material moving on the conveyor belt over the idler support to change the output signal generated by the load cell in proportion to the weight of the material.

24. The apparatus of claim 17, further comprising second means for measuring the weight of material moving along the conveyor belt, the second measuring means being coupled to a second measuring idler station, and means coupled to the first and second measuring means for averaging the weights measured by the first and second measuring means.

* * * * *